United States Patent [19]
Innes

[11] Patent Number: 5,493,101
[45] Date of Patent: Feb. 20, 1996

[54] POSITIVE TEMPERATURE COEFFICIENT TRANSITION SENSOR

[75] Inventor: Mark E. Innes, Asheville, N.C.

[73] Assignee: Eaton Corporation, Cleveland, Ohio

[21] Appl. No.: 167,759

[22] Filed: Dec. 15, 1993

[51] Int. Cl.$^6$ .................................................. H05B 1/02
[52] U.S. Cl. .................. 219/502; 219/506; 219/505; 219/481
[58] Field of Search ................................ 219/481, 505, 219/504, 508, 497, 487, 506; 338/25; 361/56, 55, 91, 103

[56] References Cited

U.S. PATENT DOCUMENTS

| | | | |
|---|---|---|---|
| 4,413,301 | 11/1983 | Middleman et al. | 361/106 |
| 4,545,926 | 10/1985 | Fouts, Jr. et al. | 252/511 |
| 4,560,498 | 12/1985 | Horsma et al. | 252/511 |
| 4,565,455 | 1/1986 | Bloore et al. | 374/164 |
| 4,775,778 | 10/1988 | van Konyenburg et al. | 219/549 |
| 4,780,598 | 10/1988 | Fahey et al. | 219/511 |
| 4,822,983 | 4/1989 | Bremner et al. | 219/505 |
| 5,064,997 | 11/1991 | Fang et al. | 219/505 |

OTHER PUBLICATIONS

PTC Application Notes, Keystone Carbon Company Bulletin T–929, pp. 34–42.
PCT/SE91/00076, Feb. 4, 1991, Hansson et al.
PCT/SE91/00375, May 28, 1991, Hasson et al.

*Primary Examiner*—Mark H. Paschall
*Attorney, Agent, or Firm*—Martin J. Moran

[57] ABSTRACT

A transition sensor is responsive to transition of a positive temperature coefficient resistive element from a nominal low resistance state to a protective high resistance state. A positive temperature coefficient (PTC) element is placed in a power distribution circuit between a power source and a load. Excessive load current in the event of a high current fault heats the PTC element to a threshold temperature at which the PTC element transitions into a protective state of high resistance, limiting current flow to the load. The LED of an optoisolator is coupled in parallel with the PTC element, preferably with a resistor in series with the LED. Under nominal current conditions the voltage across the LED is less than its forward bias voltage. During a high current fault, the LED becomes forward biased and switches on the optoisolator phototransistor to operate an alerting device such as an audible alarm and/or a light. A relay can be coupled to the phototransistor for decoupling the load and the PTC element from the power source, and preferably is arranged to latch in the protective position when tripped. The invention is applicable to direct current or alternating current and single or multi-phase applications. Optocouplers with reversed polarity LEDs are used for alternating current, one pair for each phase, with the optocoupler phototransistors coupled in parallel to operate the alerting device and/or relay.

24 Claims, 3 Drawing Sheets

POSITIVE TEMPERATURE COEFFICIENT TRANSITION SENSOR

BACKGROUND OF THE INVENTION

1. Field of the Invention

The invention relates to the field of transition sensors, and in particular to a sensing device for sensing, indicating and responding to a transition of a positive temperature coefficient resistive element into a state of high resistance.

2. Prior Art

Certain materials are known in the art to be useful as reusable fuses for limiting electrical current. These materials, known as positive temperature coefficient (PTC) resistive elements, respond to a flow of excessive current by substantially increasing in electrical resistance due to resistive heating. For example, as stated in *PTC Application Notes*, Keystone Carbon Company Bulletin T-929, P.37, "[t]he dramatic rise in resistance of a PTC at the transition temperature makes it an ideal candidate for current limiting applications. For currents below the limiting current ($I_L$), the power being generated in the unit is insufficient to heat the PTC to its transition temperature. However, when abnormally high-fault currents flow, the resistance of the PTC increases at such a rapid rate that any further increase in power dissipation results in a reduction in current."

The PTC's manufactured and marketed by Keystone Carbon Company are made of polycrystalline ceramic materials. The base compounds, usually barium titanate or solid solutions of barium and strontium titanate, are high-resistivity materials made semiconductive by the addition of dopants.

Conductive polymers also exhibit PTC characteristics. For example, Raychem Corporation manufactures and markets a current limiting polymer under the trademark Polyswitch™. Current limiting polymers having PTC characteristics are disclosed in U.S. Pat. Nos. 4,545,426; 4,560,498 and 4,775,778, owned by Raychem Corporation. Current limiting polymers typically comprise crosslinked polyethylene, heavily doped with carbon. Other materials exhibiting PTC resistance characteristics include silicon carbide and tungsten.

PTC elements for current limiting applications typically have a low electrical resistance when conducting current below a threshold value, i.e., when the PTC is relatively cool. When current flowing through the PTC exceeds the threshold, resistive heating produces a rise in the internal temperature of the PTC, causing a reduction in conductivity, i.e., an increase in electrical resistance. The power dissipated in the PTC is proportional to the resistance multiplied by the square of the current. An increase in resistance leads to further heating and a further increase of resistance. The change in resistance thus is quite rapid. Typically, the increase in resistance is virtually a step function once the magnitude of the current (and the resulting internal temperature of the polymer) surpasses the threshold value.

The change in resistance of a PTC upon passing the threshold can be quite large. For example, the resistance of a current limiting polymer upon passing the threshold may increase by a factor of 1,000 to 4,000. Assuming the PTC is in a power distribution circuit in series with a load, the increase in resistance of the PTC increases the total load resistance seen by the power line and substantially reduces the current drawn from the line. The increase in resistance of the PTC, in series with a fixed resistance load, results in more of the power line voltage occurring as a voltage drop across the PTC and less in the voltage drop across the load. Thus, a larger portion of the power from the line is dissipated in the PTC as heat, as opposed to being dissipated by the load. Depending on the line voltage, load resistance and character of the PTC element, the voltage drop across a PTC which has transitioned to its high resistance state could be large enough to destroy the PTC. This is especially true when the PTC comprises a conductive polymer. Furthermore, PTCs may-exhibit-a negative temperature coefficient (NTC) resistance characteristic if the internal temperature of the PTC goes much beyond the threshold level. If heated to the NTC level, the resistance of the PTC decreases with increasing temperature.

A PTC resistive element employed as a reusable fuse typically is coupled in series between a power source and a load for limiting current upon transition to its high resistance state. A short circuit, wiring fault or the like may cause the load circuit to sink excessive current. The PTC resistive element will conduct this excessive current for only the relatively short time until the PTC element makes a step transition into its state of high resistance. The current loading of the power line is substantially reduced; however, prolonged excessive power dissipation in the PTC resistive element could damage the PTC and require its subsequent replacement. If the PTC element is to be truly reusable, action is needed to decouple the PTC element and the load circuit from the power line before the PTC element is damaged. Furthermore, it is desirable that an operator, technician or the like be quickly advised of a circuit fault, i.e., that the PTC element has transitioned to a high resistance state, since this is symptomatic of a substantial problem in the load or power delivery circuit. It may also be appropriate in the event of a fault to decouple other related circuits from the power source. There is a need, therefore, to provide means for sensing that a current limiting PTC resistive element has transitioned to its state of high resistance. Advantageously, this sensing means is arranged for signalling and for automatically decoupling power from a malfunctioned load circuit.

SUMMARY OF THE INVENTION

It is an object of the invention to provide a transition sensor operable to sense the change of a positive temperature coefficient (PTC) resistive element to its state of high resistance.

It is another object of the invention to provide a transition sensor that is electrically isolated from the circuit containing the PTC resistive element to which the transition sensor is responsive.

Another object of the invention is to provide means for sensing the transition of a PTC resistive element into a high resistance state, which decouples the PTC element and protected load circuit from the power distribution circuit after the transition.

These and other objects are accomplished by providing at least one optoisolator having a light emitting diode and a phototransistor optically coupled with the light emitting diode. The light emitting diode of the optoisolator is coupled in parallel with the PTC element. A transition of the PTC element into its state of high resistance couples a voltage across the light emitting diode, causing the phototransistor to conduct and signaling the transition.

A PTC resistive element, such as a current limiting conductive polymer, has a nominally low resistance when cool and readily conducts current at a rate below a threshold level. Current flowing through the PTC element that exceeds a threshold level produces internal heating of the element, causing a rapid transition into a state of high resistance. Because of this characteristic, positive temperature coefficient resistive elements are useful as reusable or resettable fuses. According to the invention, the transition of the PTC resistive element into its state of high resistance is sensed, for signifying that excessive current was being drawn through the PTC element, and enabling signalling and/or corrective action such as decoupling of the load from the line.

In one embodiment of the invention, the PTC element, for example a current limiting conductive polymer, is coupled between a voltage source and a load. An optoisolator, having a light emitting diode optically coupled to a phototransistor, is used as the sensing element. The light emitting diode of the optoisolator is coupled in parallel with the PTC element, and may also have a current limiting series resistor. In a direct current arrangement, the light emitting diode is coupled in the direction of current flow, i.e., the anode of the light emitting diode is coupled to the more positive voltage side of the PTC element and the cathode of the light emitting diode is coupled to the less positive voltage side of the PTC element. A load is coupled in series with the parallel combination of the light emitting diode and PTC element.

The phototransistor of the optoisolator conducts current when the base of the phototransistor is exposed to light from the light emitting diode. In one embodiment of the invention, the phototransistor is coupled in series with a signalling device, such as a lamp, light emitting diode (LED), alarm or the like, and in parallel with a voltage source, which can be the same as or separate from the voltage source providing power to the load. When using an LED as the signalling device, it is practical to include a series resister to reduce current flow through the diode. When employing a lamp, alarm or the like, it is desirable to employ amplification to provide adequate power to the lamp, alarm, etc.

During nominal operation, the resistance of the PTC element is quite low, allowing a free flow of current through the PTC element to the load. Since the resistance of the PTC element is low, the voltage drop across the PTC element also is low. Therefore, the voltage drop across the light emitting diode is less than the forward bias voltage of the light emitting diode and no light is emitted. Typically, a silicon light emitting diode is forward biased by a voltage of 0.6–0.7 volts. A resistor preferably is placed in series with the light emitting diode to further reduce the voltage across the light emitting diode, such that the diode is not conductive when the conductive polymer is in a state of low resistance.

A fault in the load, such as a short circuit, overload, wiring fault or the like, draws excessive current from the power source, leading to rapid heating of the PTC element and a transition of the PTC element to its state of high resistance. The voltage drop across the PTC element increases substantially, and this voltage drop is applied across the resistor and light emitting diode connected in series with one another and in parallel with the PTC element. The voltage drop across the light emitting diode increases sufficiently to forward bias the light emitting diode of the optical isolator. Light emission from the light emitting diode causes the phototransistor to conduct, thereby applying current to an indicator or signalling circuit, for example including a lamp, LED, alarm circuit or switching device, for alerting a technician, operator or engineer that the PTC element has transitioned to a high resistance state, due to an apparent malfunction of the load circuit.

The sensing device can be installed in an alternating current circuit arrangement, including an AC load. In such an embodiment, the light emitting diode can conduct during half waves when forward biased, or a pair of optoisolators can be employed. The light emitting diodes of the pair of optoisolators are coupled in parallel with each other, at opposite polarities, in series with a resistor and in parallel with a PTC resistive element coupled between the line and the load circuit. The phototransistors in the optoisolators can be coupled in parallel with one another and in series with a power source and a signalling element and/or switching element.

According to a further embodiment PTC protective elements are coupled in each line of a three-phase power distribution circuit, to signal transition of a PTC element disposed in any of the three power lines into a state of high resistance.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

The invention can be used in association with various positive temperature coefficient (PTC) resistive devices, for example including silicon carbide, tungsten, polycrystalline ceramic materials having barium titanate or barium and strontium titanate as base compounds, and conductive polymers. PTCs typically have low resistance at current levels below a threshold value, i.e. when the PTC remains relatively cool. When the current flowing through the PTC to a load circuit exceeds a threshold level, resistive heating raises the internal temperature of the PTC. The electrical resistance increases with temperature, leading to further heating and increase in resistance, and protecting the load circuit by inserting a protective resistance between the line and the load.

According to an inventive aspect, the transition of a PTC element into a state of high resistance is sensed and used to activate an indicator, switching device or the like. For this purpose, at least one optoisolator having a light emitting diode, and a phototransistor responsive to the light emitting diode, is coupled with the PTC element for sensing the change in resistance by responding to the increased voltage drop across the PTC element with increased resistance. The phototransistor conducts when exposed to light emitted from the light emitting diode. The light emitting diode is coupled in parallel with the positive temperature coefficient element.

Transition of the positive temperature coefficient element into a state of high resistance produces a voltage that forward biases the light emitting diode. When forward biased, the light emitting diode triggers conduction of the phototransistor. An indicator and/or switching circuit is activated by current from the phototransistor, thus sensing and signalling the increase in resistance of the PTC element.

Figure 1:
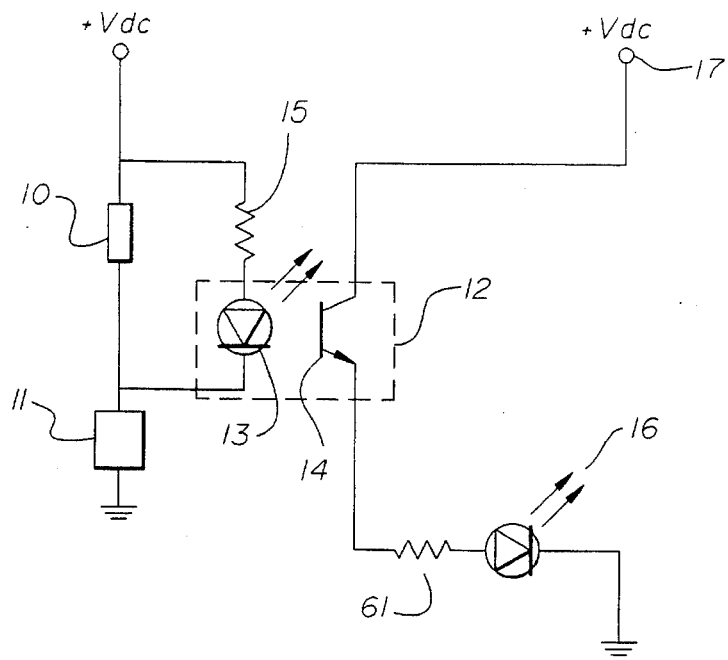
FIG. 1 is a schematic illustrating a first embodiment of the invention, in a direct current power application.

A first embodiment of the invention is shown in FIG. 1. PTC element 10 is disposed in series in a direct current path with load 11. PTC element 10 has a low electrical resistance during normal operation. However, a load malfunction such as a short, wiring fault or the like may cause load 11 to draw excessive current from the power source $V_{dc}$. This current passes through the PTC element, causing resistive heating to a greater degree than normally dissipated (the normal heat dissipation being minimal). The internal temperature of PTC element 10 rises. Once the internal temperature of PTC element 10 exceeds a threshold value that is a function of the material used for the PTC element, e.g., 100° to 125° C. according to the material of U.S. Pat. No. 4,545,926, PTC element 10 transitions into a state of high resistance. The resistance of PTC element 10 is thereby inserted between the source $V_{dd}$ and the load 11, reducing the flow of current.

According to the invention, an optoisolator 12, having light emitting diode 13 and phototransistor 14, is coupled to detect the transition of the PTC element 10 to its state of high resistance, by switching in response to the increased voltage drop across the PTC element 10 with increased resistance. Resistor 15 is coupled in series with light emitting diode 13 of optoisolator 12. Resistor 15 and light emitting diode 13 are coupled in parallel with PTC element 10. During normal operation, PTC element 10 exhibits very low electrical resistance and only a minimal voltage drop. Resistor 15 and light emitting diode 13 form a voltage divider. Under normal operating conditions the voltage across the light emitting diode 13 is insufficient to forward bias or illuminate diode 13, which requires a forward voltage of about 0.6–0.7 volts for a silicon light emitting diode. During normal operation, therefore, light emitting diode 13 is not illuminated and phototransistor 14 does not conduct.

During a fault condition such as a short, the load circuit 11 draws excessive current. PTC element 10 is resistively heated and transitions into a state of high resistance. The current drawn by the fault condition is limited by the insertion of the added resistance due to heating of the PTC element 10. Resistor 15 is selected with reference to the known resistance of PTC element 10 such that when PTC element 10 has transitioned into a high resistance state, resistor 15 prevents diversion of substantial current flow through the branch including resistor 15 and light emitting diode 13, to load 11. Resistor 15 is likewise selected so that the voltage drop across light emitting diode 13 when PTC element 10 has transitioned into a state of high resistance will at least be sufficient to forward bias light emitting diode 13.

When light emitting diode 13 is forward biased, i.e., when PTC element 10 has transitioned into a state of high resistance, the emissions of light emitting diode 13 impinge on the base of phototransistor 14, which conducts. The phototransistor 14 is coupled to a voltage source at terminal 17 and a load, shown for example as a light emitting diode 16. Resistor 61 provides current limiting protection for light emitting diode 16. Preferably, the voltage at the collector of phototransistor 14 is independent of the voltage source providing power to load 11, such that the indicator and/or switching circuit of phototransistor 14 and its load 16 are isolated from the power distribution side of the circuit.

However, it is also possible to use the same voltage source. In the embodiment shown the emitter of phototransistor 14 is coupled, through resistor 61, to the anode of LED 16 and the cathode of LED 16 is grounded. When switched on, phototransistor 14 couples current from the voltage source at terminal 17 to LED 16. Illumination of LED 16 signals a transition of PTC element 10 into its state of high resistance, which occurs due to a high current fault in load circuit 11.

Figure 2:
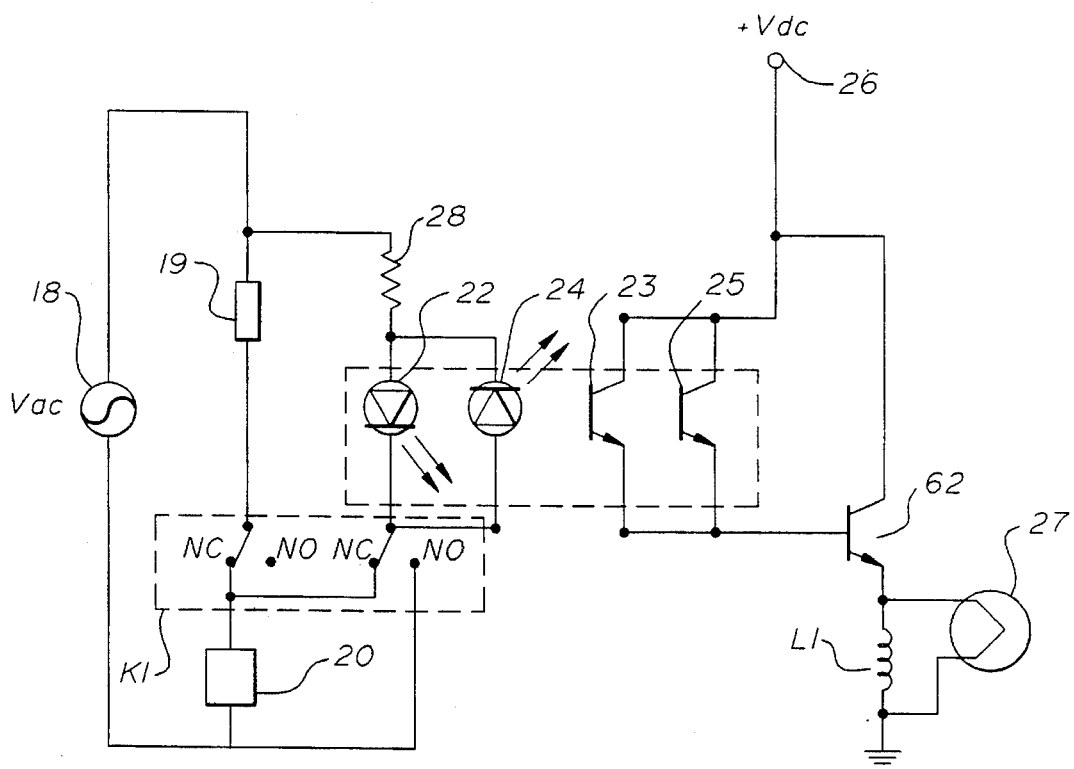
FIG. 2 is a schematic of the invention in an alternating current power application, including protective switching means.

FIG. 1 demonstrates a direct current application of the invention. FIG. 2 shows the invention as used to signal transition of a PTC element disposed in an alternating current load circuit. AC voltage source 18 provides alternating current power through PTC element 19, and to a lesser degree through resistor 28 and light emitting diodes 22, 24, through the normally closed contacts of double pole, double throw relay $K_1$. The embodiment of FIG. 2 includes a pair of optoisolators having light emitting diodes 22 and 24 coupled in parallel with one another and with PTC element 19, and at opposite polarity, i.e. the anode of light emitting diode 22 is coupled to the cathode of light emitting diode 24 and vice versa. Light emitting diode 22 is optically coupled to phototransistor 25. Light emitting diode 24 is optically coupled to phototransistor 23. Phototransistors 23 and 25 are coupled in parallel, collector to collector and emitter to emitter. The emitters of phototransistors 23 and 25 are coupled to the base of transistor 62 in a darlington configuration to provide current amplification. The emitter of transistor 62 is coupled to the parallel arrangement of relay coil $L_1$ and lamp 27. Coil $L_1$ controls the operation of contacts $K_1$. If load 20 begins to draw excessive current because of a wiring fault, short or the like, PTC element 19 transitions into a state of high resistance. The voltage drop across the parallel network defined by PTC element 19 and resistor 28 in series with light emitting diodes 22 and 24 increases, thereby forward biasing light emitting diodes 22 and 24 during alternate half cycles of the AC power. For example, if PTC element 19 has transitioned into a state of high resistance, light emitting diode 22 conducts during positive half cycles of current from AC voltage source 18 and light emitting diode 24 is reverse biased. Light emitting diode 24 is forward biased during negative half cycles, etc. The value of resistor 28 is selected with respect to the known characteristics of PTC element 19 to ensure forward biasing of diodes 22 and 24 when PTC element 19 has transitioned to its state of high resistance. When PTC element 19 is in its nominal low resistance state, the voltage across the light emitting diodes 22, 24 is insufficient to forward bias either of them.

Light emitting diodes 22, 24 are optically coupled with phototransistors 25 and 23, respectively. Conduction of either of phototransistor 23 or phototransistor 25 closes a current path for providing base current to transistor 62. Transistor 62 conducts, thereby providing current through relay coil $L_1$ and lamp 27. A DC voltage source is applied at terminal 26. When the current path between terminal 26 and ground is closed by conduction of transistor 62, relay coil $L_1$ is energized thereby toggling relay contacts $K_1$ to the normally open position of relay $K_1$. This decouples power to load 20 from AC voltage source 18, thus protecting both the load and the PTC element 19. However, the branch including resistor 28 and light emitting diodes 22, 24 remains coupled across the power source $V_{ac}$ by operation of relay contacts $K_1$. The indicator circuit is thereby latched, with the load 20 and PTC element 19 decoupled from the power source. Lamp 27 is illuminated to signal that PTC element 19 has transitioned to a high resistance state, and that the relay is tripped, thereby alerting a technician of a probable fault in load 20 or within the power delivery circuit.

Figure 4:
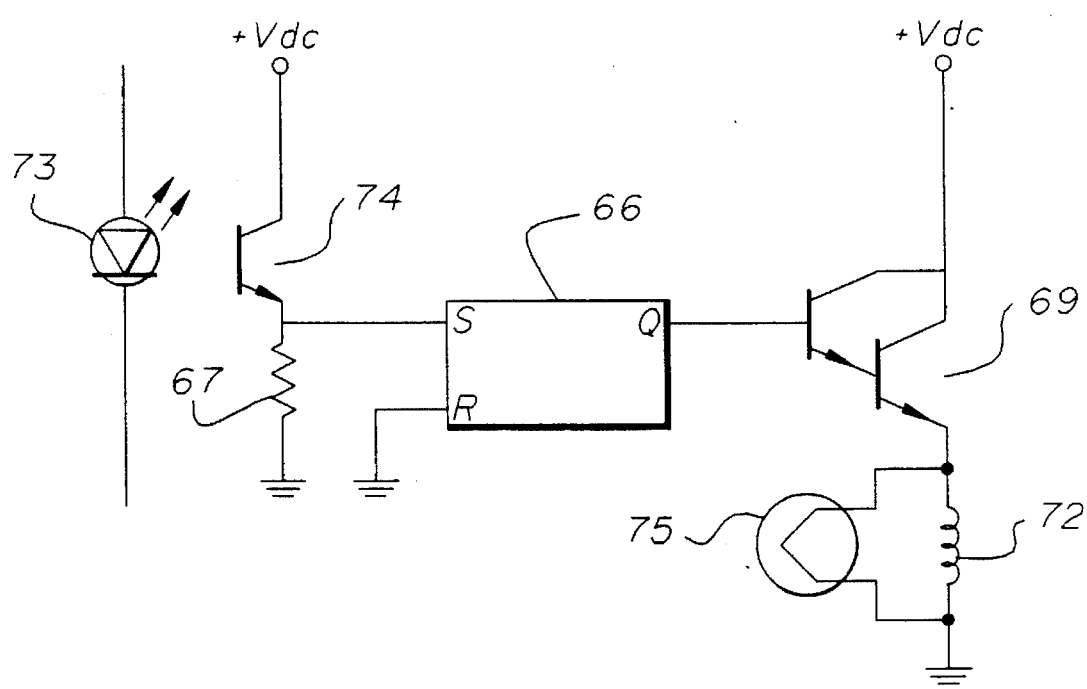
FIG. 4 is a schematic of a latching circuit which can be employed with any embodiment of the invention.

It also is possible to employ the latching circuit of FIG. 4 to maintain latching of contacts $K_1$ to the normally open positions. In such an arrangement, each normally open terminal of rely $K_1$ could be left floating i.e., not connected to anything. The latching circuit of FIG. 4 employs RS flip flop 66 and biasing resistor 67. Under nominal conditions, the inputs at S and R are digital lows i.e., approximately 0 volts. Output Q is therefore at a digital low, or approximately zero volts. Darlington pair 69 does not conduct and coil 72 is unenergized. However, upon forward biasing LED 73 and consequent conduction of phototransistor 74, $+V_{dc}$, for example $+5V_{dc}$, is applied at S. This digital high applied at S toggles the Q output to a digital high, such as +5 volts. Darlington pair 69 turns on, thereby energizing coil 72, toggling the associated relay contacts into a preferably normally open position. The normally open position of the relay contacts removes all power from the associated PTC element, load and optoisolator LED's, causing phototransistor 74 to stop conducting. The S input consequently drops low to zero volts. This, however, has no effect on the voltage at the Q output, which remains latched at a digital high. Darlington pair 69 remains on, coil 72 remains energized and lamp 75 remains lit.

Figure 3:
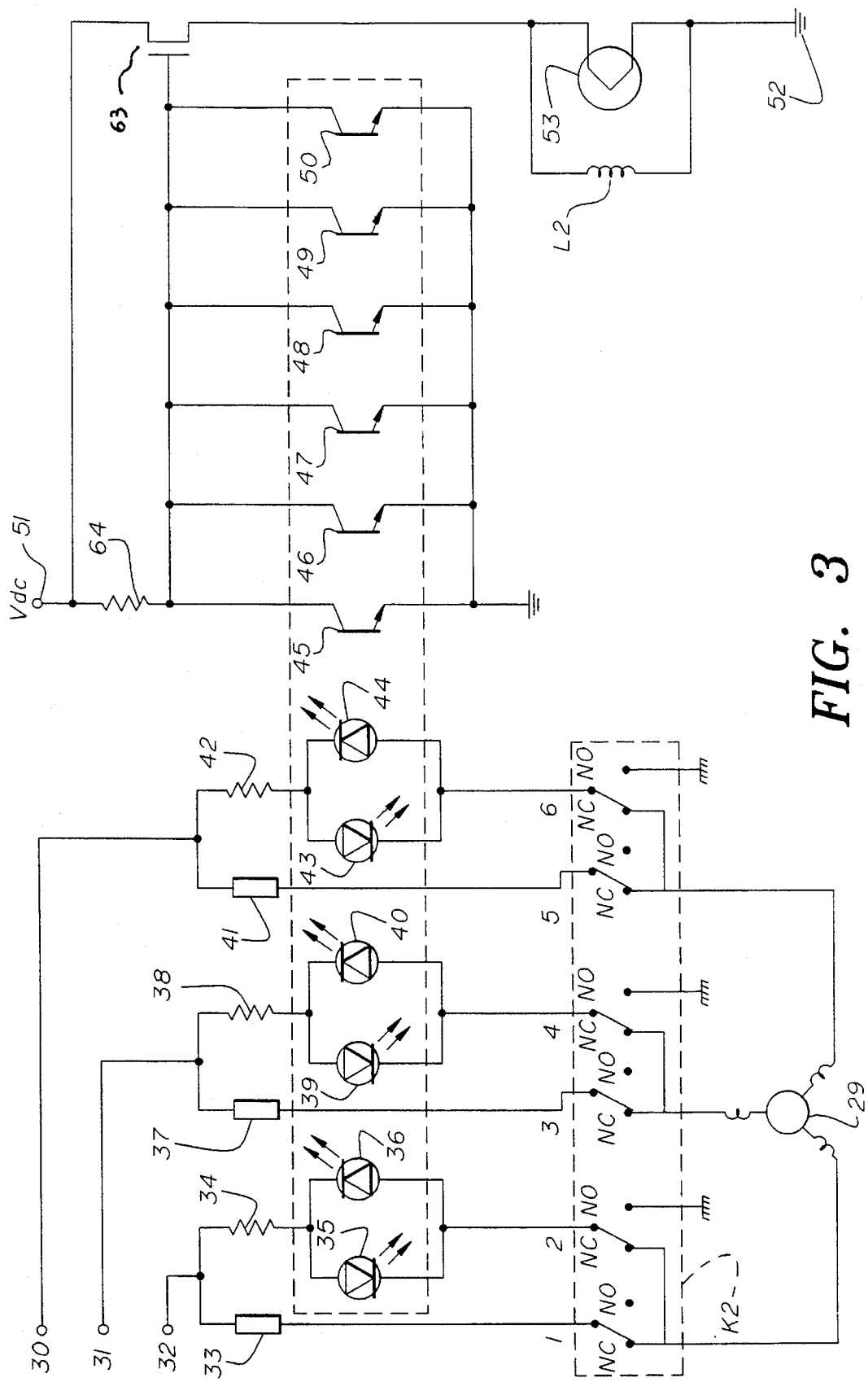
FIG. 3 is a schematic of the invention in a 3-phase power application.

FIG. 3 depicts a three phase power application, having three PTC elements 33, 37, 41 coupled to protect the respective phases of a three phase alternating current power source to three phase load 29, e.g., a motor. The respective phases are applied to terminals 30, 31 or 32. The phase applied at terminal 32 is coupled to a parallel branch circuit including PTC element 33 in parallel with resistor 34 and light emitting diodes 35 and 36, in a manner similar to the single phase AC load 20 of FIG. 2. Light emitting dimes 35 and 36 are coupled in parallel with one another in opposite polarities, i.e. anode to cathode. PTC element 33 is coupled to pole one of a six pole, double throw relay $K_2$. The branch including resistor 34 and light emitting diodes 35 and 36 is coupled to pole two of relay $K_2$. Under nominal operating conditions, current passes through poles one and two to motor 29, through the normally closed terminals of poles one and two.

In a like manner, the second power phase is applied at terminal 31 and flows through the parallel network defined by PTC element 37, which is in parallel with the series combination of resistor 38 and the light emitting diodes 39 and 40. Light emitting diodes 39 and 40 are in parallel with one another coupled in direction of opposite polarity to conduct the positive and negative half cycles of the second power phase, respectively, applied at terminal 31. PTC element 37 is coupled to the wiper of pole three of relay $K_2$. The network including resistor 38 and light emitting diodes 39 and 40 is coupled to the wiper of pole four of relay $K_2$. The normally closed terminals of poles three and four are coupled together to deliver power to the second phase winding of motor 29.

Terminal 30, carrying the third phase of the three phase power, is coupled to a parallel network including PTC element 41 in one leg and resistor 42 in series with the parallel combination of opposite polarity light emitting diodes 43 and 44. An opposite terminal of PTC element 41 is coupled to the wiper arm of pole five of relay $K_2$. The branch of the circuit including resistor 42 and light emitting diodes 43 and 44 is coupled to the wiper arm of pole six of relay $K_2$. Power is delivered to motor 29 through the normally closed terminals of poles five and six of relay $K_2$.

The light emitting diodes are thereby coupled to the respective phases of the power distribution network, each winding of motor 29 forming a load. The phototransistors responsive to the light emitting diodes are coupled in parallel, such that a high current fault on any of the phases operates indicator 53 and protective relay $L_2$-$K_2$, wired to latch open to decouple power from the motor windings. Light emitting diode 44 is optically coupled to phototransistor 45; diode 43 to phototransistor 46; diode 40 to phototransistor 47; diode 39 to phototransistor 48; diode 36 to phototransistor 49; and diode 35 to phototransistor 50.

When any one or more of light emitting diodes 35, 36, 39, 40, 43 or 44 is forward biased, which occurs during high current conditions, the corresponding phototransistor conducts, thereby biasing FET 63 to couple current from a voltage source $V_{dc}$ applied at terminal 51, through coil $L_2$ and lamp 53, to ground 52. The circuit includes biasing resistor 64.

During normal operation, PTC elements 33, 37 and 41 exhibit very little electrical resistance. Therefore, power applied at terminals 30, 31 and 32, respectively, is readily conducted through PTC elements 41, 37 and 33. Inasmuch as there is very little voltage drop across the PTC elements, and consequently across the resistor/LED branches in parallel with the PTC elements, namely resistor 34 and LEDs 35 and 36, resistor 38 and LEDs 39 and 40, and resistor 42 and LEDS 43 and 44, the LEDs are not illuminated. The phototransistors are nonconductive and relay contacts $K_2$ remain in the normally closed position shown in FIG. 3.

Light emitting diodes 35, 36, 39, 40, 43 and 44 preferably are silicon diodes, which require a forward bias of 0.6-0.7 volts to conduct. When the PTC elements are in their normal low resistance state, the voltage drop across the light emitting diodes 35, 36, 39, 40, 43 and 44 is too low to forward bias the light emitting diodes.

In the event of a wiring error or fault such as a short circuit involving one or more windings of motor 29, excessive current is drawn on at least one phase of the three phase power line. Assuming, for example, that a short occurs across the winding coupled to terminal 30, excessive current flowing through PTC element 41 raises the internal temperature of PTC element 41, causing it to transition into a state of high resistance. The transition of PTC element 41 into its high resistance state reduces the current drawn from the power line, and increases the voltage drop across the PTC element. The voltage drop across the PTC element 41 is coupled in parallel with series-connected resistor 42 and light emitting diodes 43 and 44. Thus the voltage drop across light emitting diode 43 and 44 is increased, and is sufficient to forward bias diodes 43, 44 during alternating half cycles of the power. When light emitting diodes 43 or 44 are forward biased, they emit light radiation causing the respective phototransistor 45 or 46 to conduct. Conduction of phototransistor 45 or 46 drops the voltage applied to the gate of FET 63, causing drain current to flow from the voltage source $V_{dc}$ applied at terminal 51 to ground 52, through coil $L_2$, operating relay contacts $K_2$, and lamp 53. Energizing coil $L_2$ toggles all the poles of relay contacts $K_2$ to the normally open terminals.

The normally open terminals of poles 1, 3 and 5 are open, such that power is decoupled from the windings of motor 29, and also decoupled from PTC elements 33, 37 and 41. The normally open terminals of poles 2, 4 and 6 are coupled to ground, so that current continues to flow through the parallel branches having the light emitting diodes. The power line voltage drop is now applied directly across light emitting diodes 35, 36, 39, 40, 43, 44 and their respective resistors 34, 38, 42. The circuit through relay coil $L_2$ remains energized, latching the wiper arms of all poles of relay contacts $K_2$ to the normally open terminals. Motor 29 and PTC elements 33, 37 and 41 remain decoupled from the power source until the latched circuit is reset, either by manual reset of the contacts $K_2$ or by decoupling DC power supply $V_{dc}$ at terminal 51. Conduction of any phototransistors 45–50 also illuminates lamp 53, which thereby signals that one or more of the PTC elements has transitioned to a state of high resistance, prompting the operator to investigate for a cause of the high current condition. Latching also is possible by employing a latching circuit, such as a latching circuit featuring an RS flip-flop as discussed alcove with reference to FIG. 4.

Although the foregoing description refers to a fault current drawn on the power phase coupled to terminal 30, the invention functions identically if excessive current is drawn from the power phase coupled to terminals 31 and/or 32 or any combination. For example, a fault current drawn from the phase coupled to terminal 32 will cause PTC element 33 to transition into a state of high resistance, forward biasing LED's 35 and 36 and causing conduction of phototransistors 49 and 50. A fault current drawn from the phase coupled to terminal 31 likewise will cause PTC element 37 to transition to a state of high resistance, forward biasing LEDs 39 and 40 and causing phototransistors 47 and 48 to conduct. Conduction of any or all of the phototransistors drops the gate voltage on FET 63 thereby causing drain current flow through FET 63 through relay coil $L_2$ and lamp 53.

The invention has been described with reference to electromagnetic switching of contacts $K_2$ and an output signal in the form of a visible indication from lamp $L_2$. It will be appreciated that solid state or other switching arrangements are also possible. In addition, the signal produced by conduction of one or more phototransistors 45–50 can also be used for further switching purposes, e.g., the operation of switching means of further circuits (not shown) that may be related to load 29, the generation of audible alarms or remote signals, etc.

The invention, having been disclosed in connection with the foregoing variations and examples, additional variations will now be apparent to person skilled in the art. The invention is not intended to be limited to the variations specifically mentioned, and according, reference should be made to the appended claims rather than the foregoing discussion of preferred examples to assess the scope of the invention in which exclusive rights have been claimed.

What I claim is:

1. A device for sensing transition of a current limiting positive temperature coefficient resistive element into a state of high resistance, comprising:
   at least one optoisolator comprising a light emitting diode and a phototransistor responsive to said light emitting diode, said light emitting diode being connected electrically in parallel with said positive temperature coefficient element, wherein a transition of the positive temperature coefficient element into a state of high resistance forward biases said light emitting diode, causing said phototransistor to conduct, thereby signalling the transition.

2. The device of claim 1, further comprising a resistor connected electrically in series with said light emitting diode and in parallel with said positive temperature coefficient element.

3. The device of claim 1, further comprising signalling means, said signalling means being responsive to conduction of said phototransistor to signal a transition of the positive temperature coefficient element into a state of high resistance.

4. The device of claim 3, further comprising amplifying means for providing adequate power to said signalling means upon conduction of said phototransistor.

5. The device of claim 1, wherein the positive temperature coefficient element is connected electrically in series with a source of power to a load, further comprising switching means responsive to conduction of the phototransistor for controlling application of power to the load, said switching means being operable to decouple the load from the source of power upon conduction by the phototransistor.

6. The device for claim 5, further comprising amplifying means for providing adequate power to said switching means upon conduction of said phototransistor.

7. The device of claim 5, wherein the switching means comprises a normally closed relay defining a current path between the power source and the load, the relay having a controlling coil connected electrically to an energizing power source, wherein conduction by the phototransistor energizes said coil thereby opening said relay and decoupling power from the load.

8. The device of claim 7, wherein the relay is arranged to latch upon conduction of the phototransistor, the relay having latched contacts decoupling the source of power from the load and from the positive temperature coefficient element.

9. A device for sensing transition of a current limiting positive temperature coefficient resistive element disposed in an alternating current path into a state of high resistance, comprising:
   a first optoisolator having a first light emitting diode and a first phototransistor optically connected electrically with said first light emitting diode, said first phototransistor conducting when exposed to light emissions from said first light emitting diode, said first light emitting diode coupled in parallel with said positive temperature coefficient element;
   a second optoisolator having a second light emitting diode and a second phototransistor optically coupled with said second light emitting diode, said second phototransistor conducting when exposed to light emissions from said second light emitting diode, said second light emitting diode connected electrically in parallel with said positive temperature coefficient element at an opposite polarity to that of said first light emitting diode,
   wherein said phototransistors are connected electrically in parallel in a sensing circuit, and a transition of said positive temperature coefficient element into a state of high resistance causes forward biasing of at least one of said first and second light emitting diodes, thereby causing at least one of the first and second phototransistor to conduct, for signalling the transition.

10. The device of claim 9, further comprising at least one resistor connected electrically in series with said first and second light emitting diodes.

11. The device of claim 9, further comprising signalling means, said signalling means responsive to conduction by at least one of said phototransistors to signal a transition of the positive temperature coefficient element into a state of high resistance.

12. The device of claim 11, further comprising amplifying means for providing adequate power to said signalling means upon conduction of at least one of said phototransistors.

13. The device of claim 9, wherein the positive temperature coefficient element is connected electrically in series with a source of power to a load, and further comprising switching means responsive to conduction of at least one of said first and second phototransistors, for controlling application of power to the load, said switching means decoupling power from the load upon conduction of at least one of said first and second phototransistors.

14. The device of claim 13, further comprising amplifying means for providing adequate power to said switching means upon conduction of at least one of said phototranisitors.

15. The device of claim 13, wherein the switching means comprises a normally closed relay defining a current path between the power source and the load, a controlling coil for the relay connected electrically to a coil energizing power source, wherein conduction by at least one of said first and second phototransistors energizes said coil, thereby opening said relay and removing power from the load.

16. The device of claim 15, wherein the relay is arranged to latch upon conduction of the at least one phototransistor, the relay having latched contacts decoupling the source of power from the load and from the positive temperature coefficient element.

17. A device for sensing transition of at least one of three current limiting positive temperature coefficient resistive elements into a state of high resistance, individual ones of said three positive temperature coefficient resistive elements being disposed in three separate phase lines of a three-phase alternating current transmission line, the device comprising:

an optoisolator pair for each of the three phase lines, said optoisolator pair having first and second light emitting diodes and first and second phototransistors responsive to said first and second light emitting diodes, respectively, said first and second light emitting diodes being connected electrically in parallel at opposite polarity, and in parallel with one of the three positive temperature coefficient elements for the three phase lines, said first and second phototransistors for each of the three phase lines being connected electrically in parallel with one another in a sensing circuit, the first and second light emitting diodes for each of the three phase lines being forward biased upon transition of a corresponding one of the positive temperature coefficient elements to a high resistance state.

18. The device of claim 17, further comprising at least one resistor connected electrically in series with each pair of said first and second light emitting diodes.

19. The device of claim 17, further comprising signalling means, said signalling means responsive to conduction of any one of said phototransistors to signal a transition of at least one of the positive temperature coefficient elements for said three phases into a state of high resistance.

20. The device of claim 19, further comprising amplifying means for providing adequate power to said signalling means upon conduction of any one of said phototransistors.

21. The device of claim 17, wherein the positive temperature coefficient elements are connected electrically between a source of power and a load, and further comprising switching means responsive to conduction of at least one of said phototransistors, the switching means being operable upon conduction of said at least one of the phototransistors to decouple the load from the source of power.

22. The device of claim 21, further comprising amplifying means for providing adequate power to said switching means upon conduction of any one of said phototransistors.

23. The device of claim 21, wherein the switching means comprises a normally closed relay defining a switchable current path between the power source and the load, through the positive temperature coefficient elements, a controlling coil for the relay being connected electrically to a coil energizing power source, such that conduction of any of said phototransistors energizes said coil, thereby opening said relay and removing power from the load and from the positive temperature coefficient elements.

24. The device of claim 23, wherein the relay is arranged to latch upon conduction of any one of said phototransistors in a position decoupling the power source from the load and from the positive temperature coefficient elements.

* * * * *